(12) United States Patent
Ebi et al.

(10) Patent No.: US 7,965,395 B2
(45) Date of Patent: Jun. 21, 2011

(54) OPTICAL AXIS ORIENTATION MEASURING DEVICE, OPTICAL AXIS ORIENTATION MEASURING METHOD, SPHERICAL SURFACE WAVE DEVICE MANUFACTURING DEVICE, AND SPHERICAL SURFACE WAVE DEVICE MANUFACTURING METHOD

(75) Inventors: Yusuke Ebi, Tokyo (JP); Susumu Segawa, Tokyo (JP)

(73) Assignee: Yamatake Corporation, Tokyo (JP)

( * ) Notice: Subject to any disclaimer, the term of this patent is extended or adjusted under 35 U.S.C. 154(b) by 288 days.

(21) Appl. No.: 12/408,217

(22) Filed: Mar. 20, 2009

(65) Prior Publication Data

US 2009/0236170 A1    Sep. 24, 2009

(30) Foreign Application Priority Data

Mar. 24, 2008 (JP) ................................. 2008-075864

(51) Int. Cl.
 *G01B 11/14* (2006.01)
(52) U.S. Cl. ........................................................ 356/614
(58) Field of Classification Search ............ 356/614–624
 See application file for complete search history.

(56) References Cited

U.S. PATENT DOCUMENTS

2007/0084284 A1    4/2007 Nakaso et al.
2009/0237663 A1*   9/2009 Segawa et al. ................ 356/365

FOREIGN PATENT DOCUMENTS

| JP | 2003-115743 A | 4/2003 |
| JP | 2005-291955 A | 10/2005 |
| JP | 2008-139051 A | 6/2008 |
| JP | 2009-85655 A | 4/2009 |

* cited by examiner

*Primary Examiner* — Michael P Stafira
(74) *Attorney, Agent, or Firm* — McDermott Will & Emery LLP

(57) ABSTRACT

The optical axis orientation measuring device according to the present invention is a reflective optical axis orientation measuring device for a spherical member made from a single crystal of an optically uniaxial crystal having birefringence, comprising: illuminating means for illuminating the spherical member through a polarizer; and isogyre observing means for observing the isogyre that is structured by the light that is reflected from the bottom surface of the spherical member and emitted from the spherical member through an analyzer that has a cross-nicol relationship with the polarizer.

11 Claims, 6 Drawing Sheets

FIG. 2
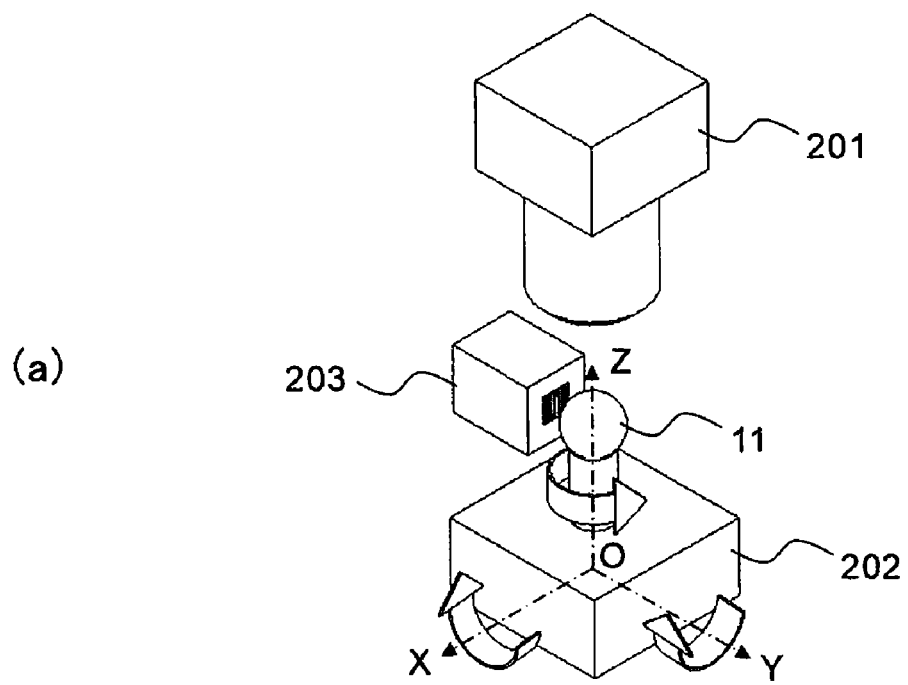
(a)
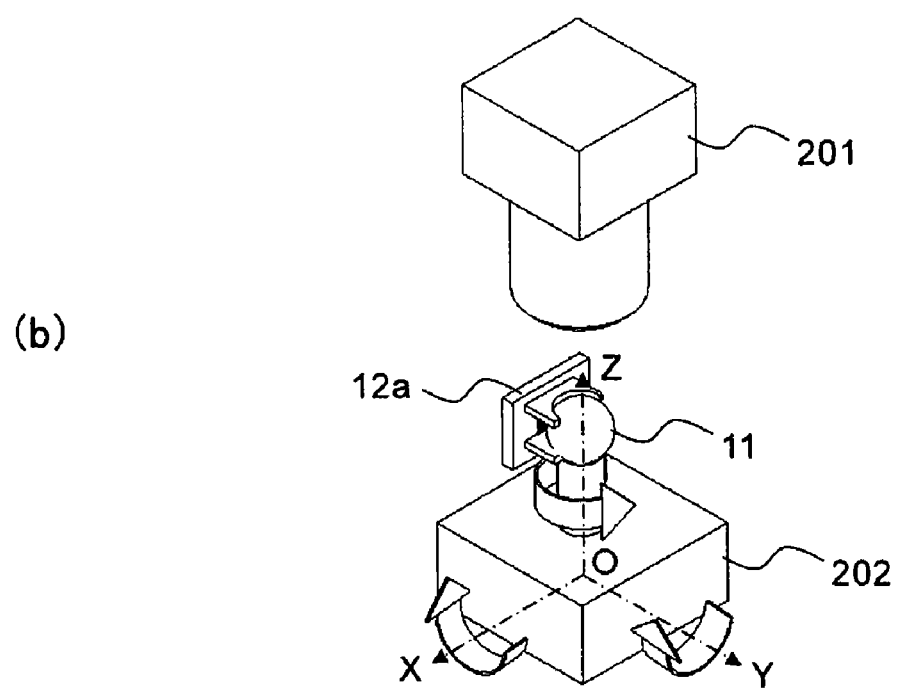
(b)

OPTICAL AXIS ORIENTATION MEASURING DEVICE, OPTICAL AXIS ORIENTATION MEASURING METHOD, SPHERICAL SURFACE WAVE DEVICE MANUFACTURING DEVICE, AND SPHERICAL SURFACE WAVE DEVICE MANUFACTURING METHOD

CROSS REFERENCE TO PRIOR APPLICATIONS

The present application claims priority under U.S.C. §119 to Japanese Patent Application No. 2008-075864, filed Mar. 24, 2008. The content of the application is incorporated herein by reference in its entirety.

FIELD OF TECHNOLOGY

The present invention relates to an optical axis orientation measuring method, an optical axis orientation measuring device using said method, a spherical surface acoustic wave device manufacturing method, and a spherical surface acoustic wave device manufacturing device using said method.

BACKGROUND OF THE INVENTION

There is a ball SAW sensor (spherical Surface Acoustic Wave device) that uses the change in the propagation speed depending on the ambient hydrogen concentration when a surface acoustic wave (SAW) propagates on the surface of a sphere made from a single crystal piezoelectric material such as liquid crystal, langasite, $LiNbO_3$, $LiTaO_3$, or the like. (See Japanese Unexamined Patent Application Publication 2003-115743 and Japanese Unexamined Patent Application Publication 2005-291955). When there is excitation of a surface acoustic wave on the surface of the sphere, the surface acoustic wave does not spread out as would a normal wave, but rather travels around a circular region, with a limited width, along the great circle of the sphere, around a specific crystallographic axis, many times, essentially without attenuation. The ball SAW sensor is an extremely sensitive hydrogen sensor because the change in the aforementioned propagation speed increases proportionately with the number of times that the surface acoustic wave has circled the sphere.

FIG. 5 illustrates schematically the structure of the surface acoustic wave device. A comb electrode 12 and a sensitive membrane 13 are formed on a spherical base member 11 made out of a piezoelectric material single crystal. The sensitive membrane 13 is made out of Pd, Ni, Pd—Ni alloy, or the like, that absorbs hydrogen. Because a sensitive membrane 13 that has absorbed hydrogen becomes rigid, causing the speed of propagation of the surface acoustic wave in the sensitive membrane 13 to become faster, this can be used as a hydrogen sensor. Here the comb electrode 12 and the sensitive membrane 13 must be formed in specific locations on the base member 11. Specifically, the comb electrode 12 and the sensitive membrane 13 are formed on an equator wherein the optical axis 14 that passes through the center of the sphere is the axis thereof, as illustrated in FIG. 5. In the specification, the optical axis that passes through the center of the sphere shall be termed simply the "optical axis." Furthermore, it is known that the characteristics of the ball SAW sensor vary depending on the position at which the comb electrode 12 is formed, even when on the equator. In particular, it is necessary to form the comb electrode 12 with high precision, because there is a sharp decline in the sensitivity of the ball SAW sensor when, in particular, the position at which the comb electrode 12 is inaccurate. Note that piezoelectric materials such as liquid crystal, langasite, $LiNbO_3$, $LiTa_3$, and the like are optically uniaxial crystals, and thus possess a single optical axis.

Here, the optical axis 14, for example, is detected in order to determine the position wherein the comb electrode 12 is to be formed. The comb electrode 12 is formed at a position that is rotated by 90° from the detected optical axis 14, or in other words, on the equator. The sensitivity of the device is reduced, and uniform quality cannot be maintained, if the position wherein the comb electrode 12 is formed is not precise. Because of this, there is the need to detect the optical axis 14 accurately, and the methods for detecting the optical axis described in Japanese Patent Application 2006-322993 and Japanese Patent Application 2007-253006 have been used by the authors. The optical axis can be detected easily and accurately through these methods.

However, as described above, it is necessary to specify the equator from the detected optical axis 14, and further necessary to specify the optimal position on the equator, and to form the comb electrode 12 thereon. Specifically, after detecting the optical axis 14 of a base member 11 that has a diameter of 1 mm, the base member 11 is held and transferred to the next process, and in the next process, a surface acoustic wave is excited at a position that is 90° from the detected optical axis 14, and the comb electrode 12 is formed at an optimal position that is specified by the signal thereof. This type of operation is complex, and there is the possibility that, in this process, there will be inaccuracies in the position at which the comb electrode 12 is formed.

In particular, in the conventional optical axis measuring method, as illustrated in FIG. 6, a collimated beam is illuminated through a polarizer 2 from one side of a base member 11, which is the object to be measured, and the isogyre that is structured from a light that passes through the base member 11 and an analyzer 7 is observed. That is, a device with a transmissive optics system was used. In the transmissive type, an illumination system (a light source 1, a polarizer 2, a red filter 3, an aperture stop 4, and a condenser lens 5) was provided on the bottom side of the object to be measured, and an observation system (an object lens 6, the analyzer 7, and a CCD camera 8) was provided on the top side. Because of this, in order to support the base member 11, it was necessary to hold the base member in the vicinity of the equator, which is the propagation path for the surface acoustic waves. Consequently, after the measurement of the optical axis, it is not possible to determine the optimal position for forming the comb electrode 12 by exciting a surface acoustic wave from the outside while in that state, leaving no choice but to transfer to the next process.

The object of the present invention is to provide a method for measuring the optical axis of a spherical optically uniaxial crystal wherein the measurement itself of the optical axis is easy, and wherein the detection of the equatorial plane and the processing and assembly thereafter is easy as well.

SUMMARY OF THE INVENTION

The optical axis orientation measuring device according to an embodiment according to the present invention is a reflective optical axis orientation measuring device for a spherical member made from a single crystal of an optically uniaxial crystal having birefringence, including: illuminating means for illuminating the spherical member through a polarizer; and isogyre observing means for observing the isogyre that is structured by the light that is reflected from the bottom surface of the spherical member and emitted from the spherical member through an analyzer that has a cross-nicol relationship with the polarizer.

The optical axis orientation measuring device according to this embodiment of the present invention is characterized by the further provision of supporting means for supporting the spherical member from the side that is opposite from that whereon the light is incident.

An optical axis orientation measuring device in another form of the present invention is characterized by the spherical member, in the form set forth above, being able to be rotated, by the supporting means, around the X axis, the Y axis, and the Z axis, with the optical axis of the light that is incident on the spherical member as the Z axis.

An optical axis orientation measuring device in a further form of the present invention, as set forth above, further including surface acoustic wave receiving means, which can be disposed in proximity to the spherical member in the horizontal plane passing through the center of the spherical member, for exciting surface acoustic waves in the spherical member, and for receiving surface acoustic waves.

A spherical surface acoustic wave device manufacturing device of a fifth form of the present invention including the various optical axis orientation measuring device mechanisms of the fourth form, and further comprises comb electrode applying means for applying a comb electrode chip onto an equator that has the optical axis of the spherical member as the axis thereof.

An optical axis orientation measuring method of a form of the present invention is an optical axis orientation measuring method for a spherical member made from a single crystal of an optically uniaxial crystal having birefringence, having: a step for causing light to be incident on the spherical member through a polarizer; and a step for observing the isogyre that is structured by the light that is reflected from the bottom surface of the spherical member and emitted from the spherical member through an analyzer that has a cross-nicol relationship with the polarizer.

The optical axis orientation measuring as set forth above, where the spherical member is supported from the side that is opposite from that whereon the light is incident.

An optical axis orientation measuring method in a eighth form of the present invention is characterized by the spherical member being able to be rotated around the X axis, the Y axis, and the Z axis, with the optical axis of the light that is incident on the spherical member as the Z axis.

An optical axis orientation measuring method according to the present invention, includes a step for observing the isogyre to cause the optical axis of the spherical member to be coincident with the optical axis of the incident light.

A spherical surface acoustic wave device manufacturing method is provided with the various steps of the optical axis measuring method as set forth above, and further has a step for applying a comb electrode chip onto the equator.

The present invention is able to provide a method for measuring the optical axis of a spherical optically uniaxial crystal wherein the measurement itself of the optical axis is easy, and wherein the detection of the equatorial plane and the processing and assembly thereafter is easy as well.

BRIEF DESCRIPTION OF THE DRAWINGS

FIG. 2 is a schematic diagram illustrating a reflective-type in an optical axis measuring device according to a form of embodiment according to the present invention.

DETAILED DESCRIPTION OF THE INVENTION

A form of embodiment of the present invention will be described below. Note, however, that the present invention is not limited to the form of embodiment set forth below. Additionally, for clarity in the explanation, the description and drawings below have been abbreviated and simplified as appropriate.

Figure 1:
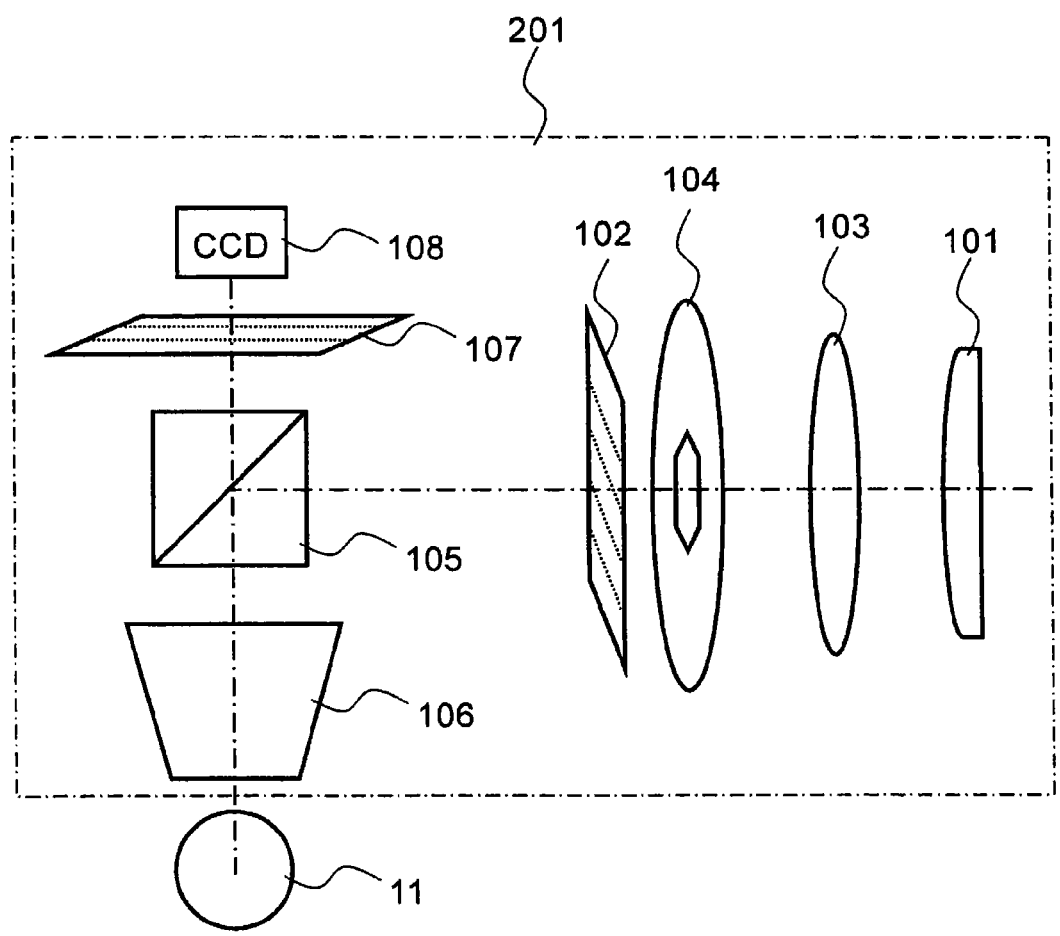
FIG. 1 is a schematic diagram illustrating the optics system in a reflective-type optical axis measuring device according to a form of embodiment according to the present invention.

The optical axis orientation measuring device for a spherical member made out of an optically uniaxial single crystal according to the present form of embodiment of the present invention will be explained using FIG. 1. The optics system for measurement will be explained first. FIG. 1 is a diagram illustrating schematically the structure of the optics system for measurement in relation to the present form of embodiment. The optics system for measurement in relation to the present form of embodiment is provided with a light source 101, a polarizer 102, a light wavelength filter 103, an aperture stop 104, a half mirror 105, an object lens 106, an analyzer 107, and a CCD camera 108, as illustrated in FIG. 1. Specifically, a polarizing microscope is provided with this type of structure.

As is illustrated in FIG. 1, the optics system is of a reflective type. Specifically, the light source 101, the polarizer 102, the light wavelength filter 103, the aperture stop 104, and the half mirror 105 that structure an illumination system are arranged in a line in the horizontal direction. On the other hand, the object lens 106, the half mirror 105, the analyzer 107, and the CCD camera 108, which structure an observation system, are arranged in a line in the vertical direction. That is, the illumination system and the observation system have a perpendicular positional relationship. Here the half mirror 105 is positioned at the intersection between the optical axis of the observation system and the optical axis of the illumination system. Note that the illumination system and the observation system are not limited to this structure, but rather may be structured with the incident light and the emitted light in the same region.

The object to be measured is the base member 11 of the acoustic surface wave device, and is positioned below the object lens 106. The base member 11 is a spherical member made out of a single crystal having birefringence. Liquid crystal, langasite, $LiNbO_3$, $LiTaO_3$, and the like, can be listed as specific substances from which to form the base member 11. Note that while in the ball SAW sensor usually a base member 11 having a diameter of between about 1 and 10 mm was used, in the optical axis orientation measuring method as set forth in the present invention, there is no limitation on the diameter.

First, the light that is emitted from the light source 101 passes through a light wavelength filter 103, which passes only light of a specific wavelength, to produce monochromatic light. Then a beam, which is narrowed by the aperture stop 104, is formed into a linearly polarized beam by passing through the polarizer 102. The beam that goes vertically downward from the half mirror 105 passes through the object lens 106 to be incident on the base member 11. The beam that is reflected at the base member 11 is again incident on the object lens 106, and thereafter, the beam that passes through the half mirror 105 passes through the analyzer 107, which is disposed in the cross-nicol direction from the polarizer 102, to be observed using the CCD camera 108.

Here the beam is observed, from the optical axis direction of the birefringent crystal, as interference fringes that are concentric circles, and a cross-shaped isogyre wherein there is an intersection in the center thereof. That is, the center of the interference fringes and the center of the isogyre are coincident. Consequently, observing the center of the isogyre is synonymous with observing the center of the interference fringes. Even in a reflective type, it is possible to observe the isogyre in the same manner as in the transistor type.

Here, as illustrated in FIG. 2, an optical axis orientation measuring device as set forth in the present example of embodiment according to the present invention is provided with a ball positioning unit 202 and a surface acoustic wave transceiving device 203, in addition to the optical axis detecting unit 201 as explained in detail using FIG. 1. Here the optical axis detecting unit 201 is disposed above the base member 11 in the vertical direction. Additionally, the ball positioning unit 202 holds the base member 11 from the bottom side in the vertical direction. Additionally, the surface acoustic wave transceiving device 203 can be disposed in proximity to the base member 11, in the horizontal plane that passes through the center of the base member 11. Note that the present invention is not limited to this structure, but rather, for example, the optical axis detecting unit 201 may be positioned at an upper oblique and the ball positioning unit 202 may be positioned at the lower oblique opposite thereof.

The ball positioning unit 202, as illustrated in FIG. 2, is capable of rotational motion around the X, Y, and Z axes. The base member 11 can be positioned in any given position by the ball positioning unit 202, and the direction of the optical axis of the base member 11 can be adjusted to the vertical direction.

Figure 6:
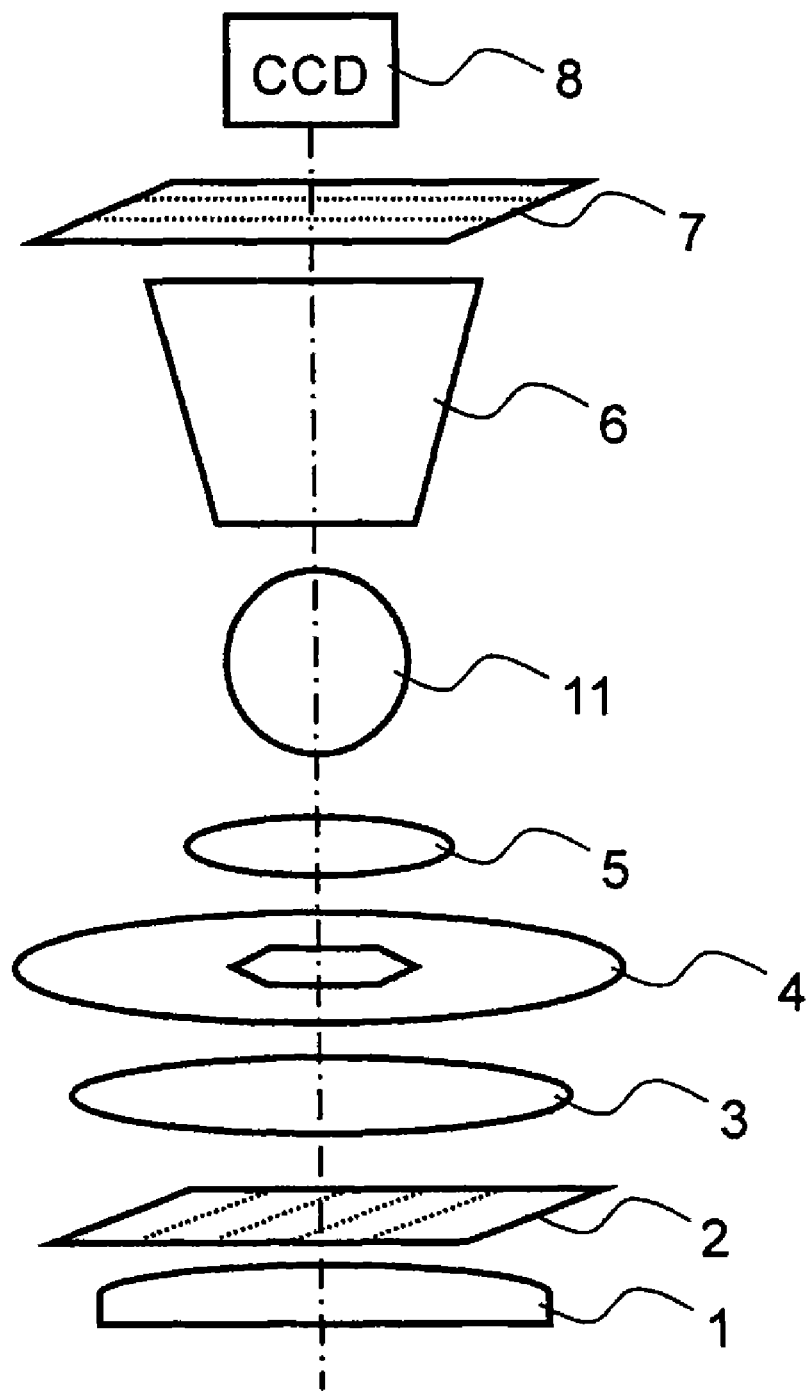
FIG. 6 is a schematic diagram illustrating an optics system in a transmissive-type optical axis measuring device.

In the optical axis measuring device of the transmissive type, as illustrated in FIG. 6, the illumination system is provided below the object to be measured, and the observation system is provided above. Because of this, in order to support the base member 11, it was necessary to hold the base member in the vicinity of the equator. Consequently, after the measurement of the optical axis, it is not possible to determine the optimal position for forming the comb electrode 12 by exciting a surface acoustic wave from the outside while in that state, leaving no choice but to transfer to the next process. On the other hand, because the optical axis measuring device according to the present invention is provided with a reflective optics system, it is possible to support the base member 11 from below, in the vertical direction, as described above.

Specifically, as illustrated in FIG. 2(*a*), for example, in the optical axis measuring device according to the present invention, the ball positioning unit 202 can be operated while the isogyre is being observed by the optical axis detecting unit 201, to cause the optical axis of the base member 11 to be coincident with the vertical axis (the Z axis in the diagram), which is the optical axis of the optical axis detecting unit 201. Doing so makes it possible to position the optical axis on the axis, and the equator on the horizontal plane.

Figure 5:
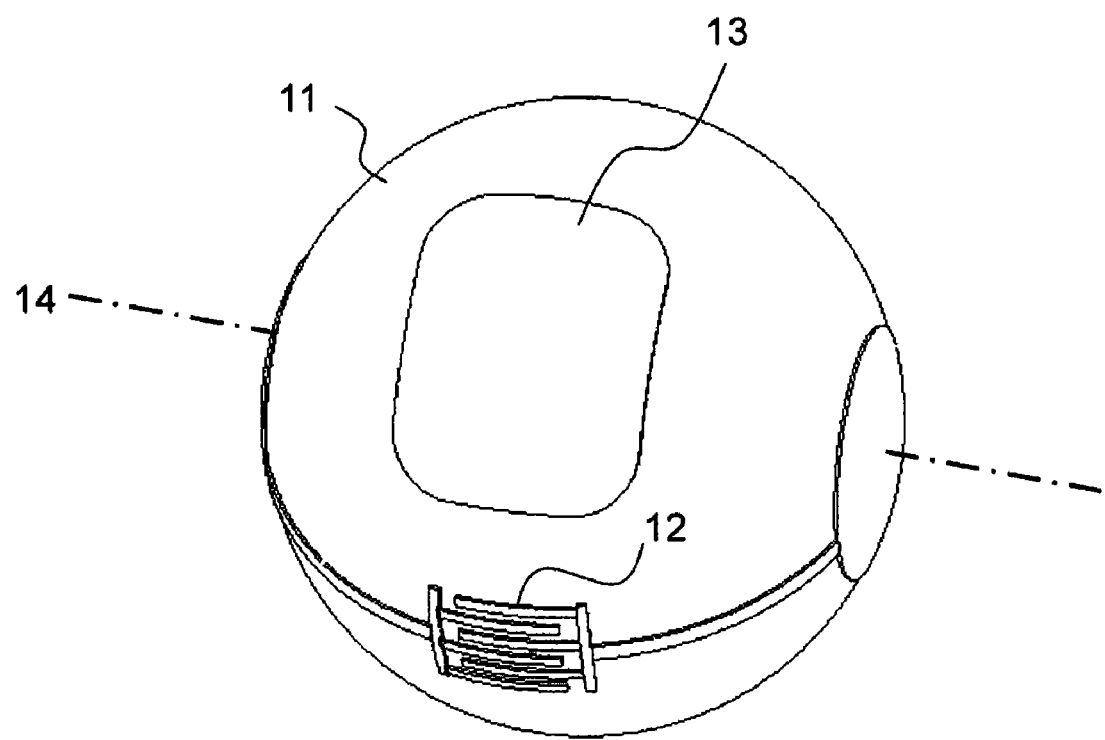
FIG. 5 is a schematic diagram illustrating the structure of a ball SAW sensor.

Here, as illustrated in FIG. 5, the comb electrode is formed on the equator. As illustrated in FIG. 2(*a*), the optimal position for forming the comb electrode is determined using the surface acoustic wave transceiving device 203. The surface acoustic wave transceiving device 203 is disposed on the horizontal plane that passes through the center of the base member 11. When the vertical axis and the optical axis of the base member 11 are coincident, then the horizontal plane that passes through the center of the base member 11 will be the equatorial plane. Here the "equatorial plane" refers to the plane that includes the equator when the axis thereof is the optical axis. The comb electrode is formed in the surface acoustic wave transceiving device 203. This makes it possible to excite a surface acoustic wave on the base member 11, and to monitor the frequency, etc., of the surface acoustic wave that has been excited, while the ball positioning unit 202 rotates the base member 11 around the Z axis, to measure the crystallographic orientation of the spherical member. The base member 11 is supported from below, in the vertical direction, in the present invention, as described above, making it possible to determine the position for forming the comb electrode 12 optimally on the equator, while yet in that state, that is, without transferring the base member 11 to the a subsequent process.

Furthermore, as illustrated in FIG. 2(*b*), for example, after determining the optimal position for forming the comb electrode 12 on the equator, it is possible to apply the comb electrode chip 12*a* to that position. Here the comb electrode chip is a structure wherein the comb electrode, conducting portions for connecting the comb electrode to external electrodes, and terminal portions are structured on a chip. The base member 11 is supported from below, in the vertical direction, in the present invention, as described above, making it possible to apply the comb electrode 1212*a* at the optimal position on the equator, while yet in that state, that is, without transferring the base member 11 to the a subsequent process. This makes it possible to apply the comb electrode 1212*a* onto the base member 11 easily and with excellent precision.

Figure 3:
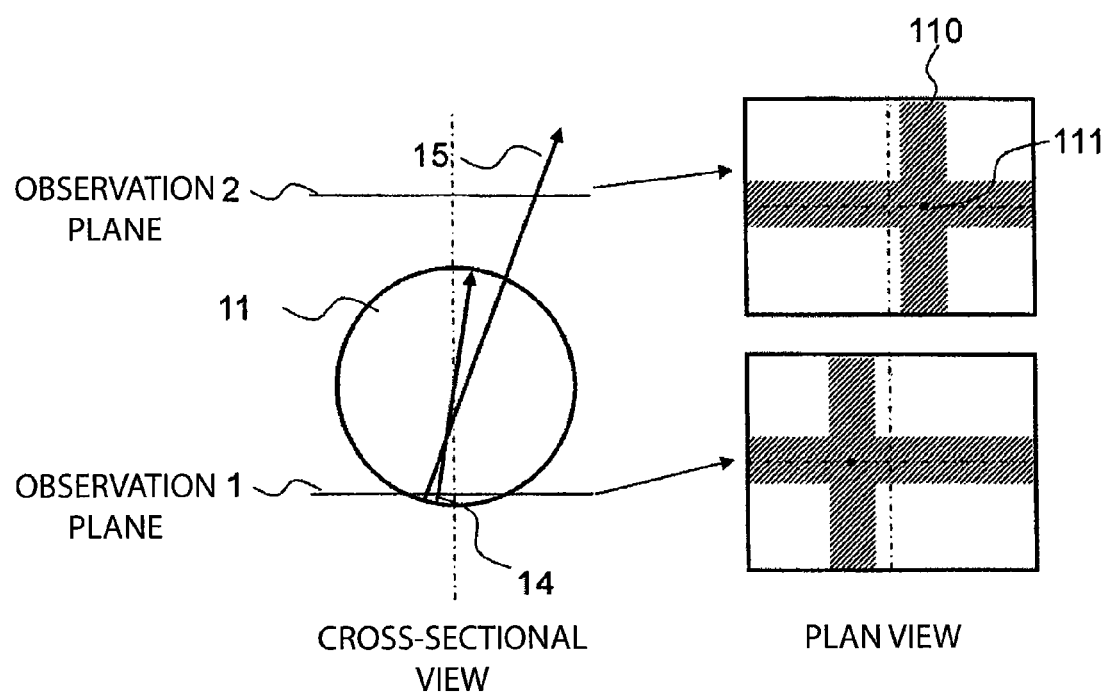
FIG. 3 is a schematic diagram illustrating the optical path of the light that forms the center of the isogyre.
Figure 4:
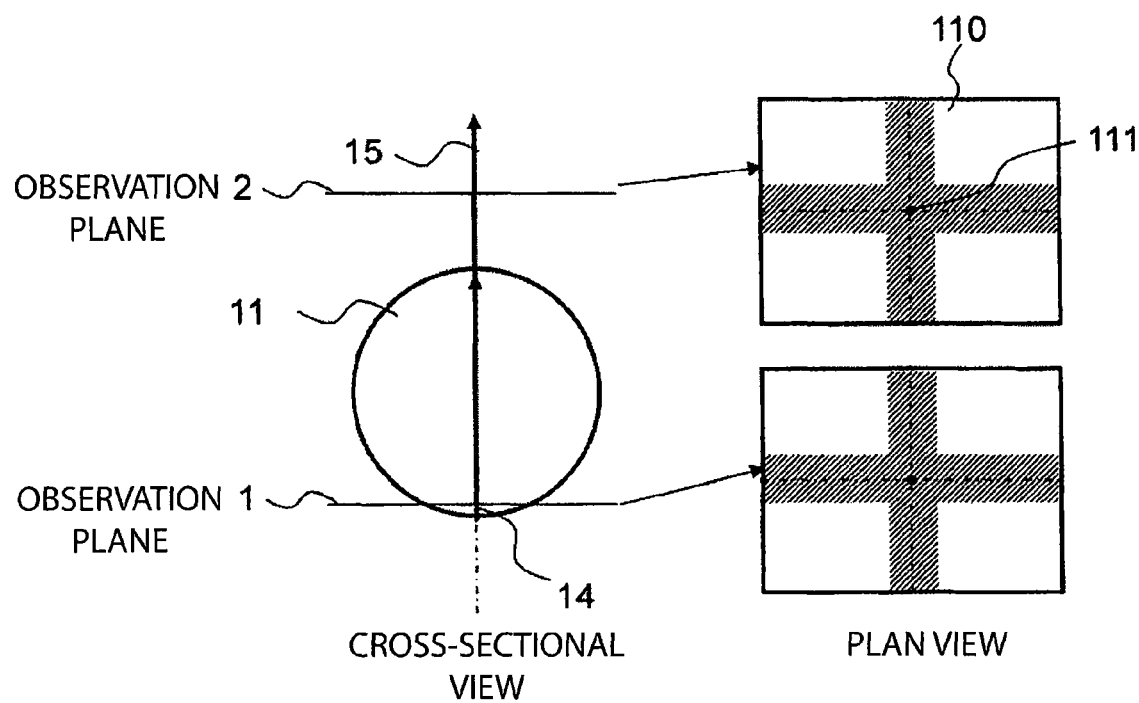
FIG. 4 is a schematic diagram illustrating the optical path of the light that forms the center of the isogyre.

The optical axis orientation measuring method using the isogyre will be explained next using FIG. 3 and FIG. 4. FIG. 3 is a cross-sectional diagram illustrating the case wherein the optical axis 14 of the base member 11 is not parallel to the optical axis of the optics system for measurement. On the other hand, FIG. 4 is a cross-sectional diagram illustrating the case wherein the optical axis 14 of the base member 11 is parallel to the optical axis of the optics system for measurement. Note that FIG. 3 and FIG. 4, are, specifically, cross-sectional diagrams using a plane that passes through the center of the base member 11 that is parallel to the optical axis of the measurement optics system and the optical axis 14 of the base member 11.

As a shown on the right side in FIG. 3, when the optical axis 14 is shifted through a rotation to the right around the optical axis of the measurement system and an observation is made at an observing plane 1 that is in proximity to the bottom surface of the base member 11, the isogyre center 111 will be observed as shifted towards the left side from the center line of the base member 11.

Additionally, when observed at an observing plane 2 that is above the base member 11, the isogyre center 111 will be observed shifted towards the right side from the center line. The path 15 of the isogyre center 111 when the observation plane is changed will form a straight line.

FIG. 4 will be explained next. In FIG. 4, the optical axis 14 of the base member 11 is parallel to the optical axis of the measurement optics system, so in both of the observation planes 1 and 2, described in FIG. 3, the isogyre center 111 will be observed as being coincident with the center line of the base member 11, such as in the observed image illustrated on the right side in FIG. 4. As a result, it is known that the optical axis 14 of the base member 11 is coincident with the optical axis of the measurement optics system.

As described above, in the optical axis measuring device according to the present invention, the ball positioning unit 202 can be operated while the isogyre is being observed by the optical axis detecting unit 201, to cause the optical axis of the base member 11 to be coincident with the vertical axis (the Z axis in the diagram), which is the optical axis of the optical axis detecting unit 201. This makes it possible to determine the optical axis 14 of the base member 11 easily.

Note that in FIG. 3 and FIG. 4, the observation planes 1 and 4 are planes that are perpendicular to the optical axis of the measurement optics system, and are positioned at the focal points of the object lens 106, explained using FIG. 1.

As described above, because the optical axis measuring device according to the present invention is provided with a reflective optics system, it is possible to support the base member 11 from the opposite side from that wherein the light is incident. As a result, after the optical axis measurement, it is possible to form the comb electrode in the optimal position on the equator will yet in that state, without having to transfer [the base member 11 to a subsequent process].

The invention claimed is:

1. A reflective optical axis orientation measuring device for a spherical member made from a single crystal of an optically uniaxial crystal having birefringence, comprising:
    an illuminating device illuminating the spherical member through a polarizer; and
    an isogyre observing device observing the isogyre that is structured by the light that is reflected from the bottom surface of the spherical member and emitted from the spherical member through an analyzer that has a cross-nicol relationship with the polarizer.

2. An optical axis orientation measuring device set forth in claim 1, further comprising:
    a supporting device supporting the spherical member from the side that is opposite from that whereon the light is incident.

3. An optical axis orientation measuring device as set forth in claim 2, wherein:
    the spherical member can be rotated by the supporting device around the X axis, the Y axis, and the Z axis, with the optical axis of the light that is incident on the spherical member as the Z axis.

4. An optical axis orientation measuring device comprising the various optical axis orientation measuring device mechanisms set forth in claim 2, further comprising:
    a surface acoustic wave receiver disposed in proximity to the spherical member in the horizontal plane passing through the center of the spherical member, for exciting surface acoustic waves in the spherical member, and for receiving surface acoustic waves.

5. A spherical surface acoustic wave device manufacturing device comprising the various optical axis orientation measuring device mechanisms set forth in claim 4, further comprising:
    a comb electrode applyer applying a comb electrode chip onto an equator that has the optical axis of the spherical member as the axis thereof.

6. An optical axis orientation measuring method for a spherical member made from a single crystal of an optically uniaxial crystal having birefringence, comprising the steps of:
    causing light to be incident on the spherical member through a polarizer; and
    observing the isogyre that is structured by the light that is reflected from the bottom surface of the spherical member and emitted from the spherical member through an analyzer that has a cross-nicol relationship with the polarizer.

7. An optical axis orientation measuring method set forth in claim 6, wherein:
    the spherical member is supported from the side that is opposite from that whereon the light is incident.

8. An optical axis orientation measuring method as set forth in claim 7, wherein:
    the spherical member can be rotated around the X axis, the Y axis, and the Z axis, with the optical axis of the light that is incident on the spherical member as the Z axis.

9. An optical axis orientation measuring method as set forth in claim 7, further comprising a step of:
    observing the isogyre to cause the optical axis of the spherical member to be coincident with the optical axis of the incident light.

10. An optical axis orientation measuring method as set forth in claim 9, further comprising a step of:
    exciting surface acoustic waves on an equator that has the optical axis of the spherical member as the axis thereof, and for receiving a surface acoustic wave.

11. A spherical surface acoustic wave device manufacturing device comprising the various steps of the optical axis orientation measuring device method set forth in claim 10, further comprising a step of applying a comb electrode chip the equator.

* * * * *